(12) United States Patent
Vetters et al.

(10) Patent No.: US 10,550,709 B2
(45) Date of Patent: Feb. 4, 2020

(54) FULL HOOP BLADE TRACK WITH FLANGED SEGMENTS

(71) Applicants: Rolls-Royce North American Technologies, Inc., Indianapolis, IN (US); Rolls-Royce Corporation, Indianapolis, IN (US); Rolls-Royce plc, London (GB); Rolls-Royce High Temperature Composites Inc., Cypress, CA (US)

(72) Inventors: Daniel K. Vetters, Indianapolis, IN (US); Aaron D. Sippel, Zionsville, IN (US); David J. Thomas, Brownsburg, IN (US); Andrew J. Eifert, Indianapolis, IN (US); Paul A. Davis, Bristol (GB); Simon L. Jones, Bristol (GB); Steven M. Hillier, Manchester (GB); Peter Broadhead, Derby (GB); Joseph Doyle, Fountain Valley, CA (US); Michael Jacquinto, Long Beach, CA (US); Wesley Thibault, Santa Monica, CA (US); Jun Shi, Carmel, IN (US); Roderick Townes, Allestree (GB)

(73) Assignees: Rolls-Royce North American Technologies Inc., Indianapolis, IN (US); Rolls-Royce Corporation, Indianapolis, IN (US); Rolls-Royce plc (GB); Rolls-Royce High Temperature Composites Inc., Cypress, CA (US)

(*) Notice: Subject to any disclaimer, the term of this patent is extended or adjusted under 35 U.S.C. 154(b) by 953 days.

(21) Appl. No.: 15/088,884

(22) Filed: Apr. 1, 2016

(65) Prior Publication Data

US 2016/0319688 A1 Nov. 3, 2016

Related U.S. Application Data

(60) Provisional application No. 62/155,237, filed on Apr. 30, 2015.

(51) Int. Cl.
*F01D 11/08* (2006.01)
*F01D 5/12* (2006.01)
(Continued)

(52) U.S. Cl.
CPC .............. *F01D 11/08* (2013.01); *F01D 5/02* (2013.01); *F01D 5/12* (2013.01); *F01D 25/246* (2013.01);
(Continued)

(58) Field of Classification Search
CPC ... F01D 11/08; F01D 5/02; F01D 5/12; F01D 25/24; F01D 25/243; F01D 25/246;
(Continued)

(56) References Cited

U.S. PATENT DOCUMENTS 2,848,156 A * 8/1958 Oppenheimer ....... F01D 11/001 415/108
4,676,715 A * 6/1987 Imbault ................ F01D 25/246 415/116

(Continued)

FOREIGN PATENT DOCUMENTS

EP 1965030 A2 9/2008
EP 2631434 A2 8/2013
(Continued)

OTHER PUBLICATIONS

European Official Action dated Jun. 15, 2018 issued in connection with European Patent Appln. No. 16165823.2; 4 pages.
(Continued)

*Primary Examiner* — Carlos A Rivera
*Assistant Examiner* — Alexander A White
(74) *Attorney, Agent, or Firm* — Barnes & Thornburg LLP

(57) ABSTRACT

A blade track assembly is disclosed. The blade track assembly comprises a plurality of ceramic matrix composite blade
(Continued)

track segments arranged circumferentially adjacent to one another around a central axis. Each of the blade track segments includes an arcuate runner extending in a circumferential direction around a portion of the central axis and is coupled to circumferentially adjacent blade track segments.

9 Claims, 5 Drawing Sheets

(51) Int. Cl.
*F01D 25/24* (2006.01)
*F01D 5/02* (2006.01)

(52) U.S. Cl.
CPC ...... *F05D 2220/32* (2013.01); *F05D 2240/11* (2013.01); *F05D 2260/20* (2013.01); *F05D 2260/30* (2013.01); *F05D 2300/6033* (2013.01)

(58) Field of Classification Search
CPC .............. F04D 29/526; F05D 2220/32; F05D 2240/11; F05D 2260/20; F05D 2260/30; F05D 2300/6033
See application file for complete search history.

(56) References Cited

U.S. PATENT DOCUMENTS

| | | | |
|---|---|---|---|
| 4,687,396 A * | 8/1987 | Berecz | B29C 65/601 264/249 |
| 5,314,282 A * | 5/1994 | Murphy | B29C 53/562 244/132 |
| 5,363,643 A * | 11/1994 | Halila | F23R 3/002 60/752 |
| 5,441,385 A * | 8/1995 | Boyd | F01D 9/042 415/209.2 |
| 5,713,522 A * | 2/1998 | Lundberg | F02K 1/805 239/265.39 |
| 6,045,310 A * | 4/2000 | Miller | F16B 19/1036 411/356 |
| 6,884,026 B2 * | 4/2005 | Glynn | F01D 11/08 415/113 |
| 7,771,160 B2 | 8/2010 | Shi et al. | |
| 8,167,546 B2 | 5/2012 | Shi et al. | |
| 8,496,431 B2 | 7/2013 | Habarou et al. | |
| 8,511,975 B2 | 8/2013 | Shi et al. | |
| 8,568,091 B2 | 10/2013 | McCaffrey | |
| 8,684,689 B2 | 4/2014 | Guo et al. | |
| 8,801,372 B2 | 8/2014 | Shi et al. | |
| 8,834,106 B2 | 9/2014 | Luczak | |
| 9,903,590 B2 * | 2/2018 | Garry | F23M 5/04 |
| 2012/0156029 A1 | 6/2012 | Karafillis et al. | |
| 2012/0301269 A1 | 11/2012 | Alvanos et al. | |
| 2013/0011248 A1 | 1/2013 | Croteau et al. | |
| 2013/0251446 A1 * | 9/2013 | Bird | F16B 5/0635 403/220 |
| 2014/0202168 A1 | 7/2014 | Shapiro et al. | |
| 2015/0377035 A1 * | 12/2015 | Freeman | F01D 11/12 416/191 |
| 2016/0169261 A1 * | 6/2016 | Peters | F16B 33/004 411/383 |
| 2016/0194979 A1 * | 7/2016 | Blaney | F01D 11/10 415/116 |

FOREIGN PATENT DOCUMENTS

| | | |
|---|---|---|
| EP | 3088665 A1 | 11/2016 |
| FR | 2980235 B1 | 4/2015 |
| WO | 2014163674 A1 | 10/2014 |
| WO | 2015023324 A2 | 2/2015 |
| WO | 2015157751 A1 | 10/2015 |

OTHER PUBLICATIONS

Extended European Search Report, European Application No. 16165823.2-1610, dated Sep. 12, 2016, 7 pages.

* cited by examiner

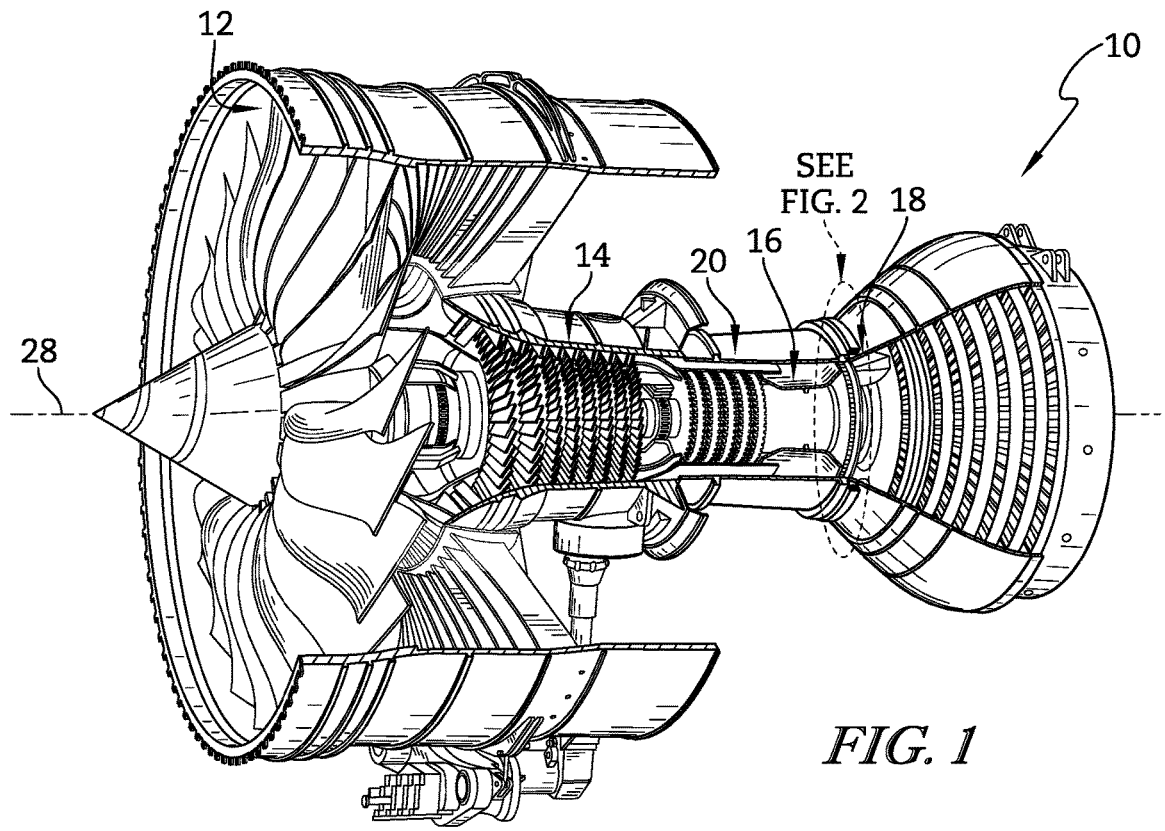
*FIG. 1*
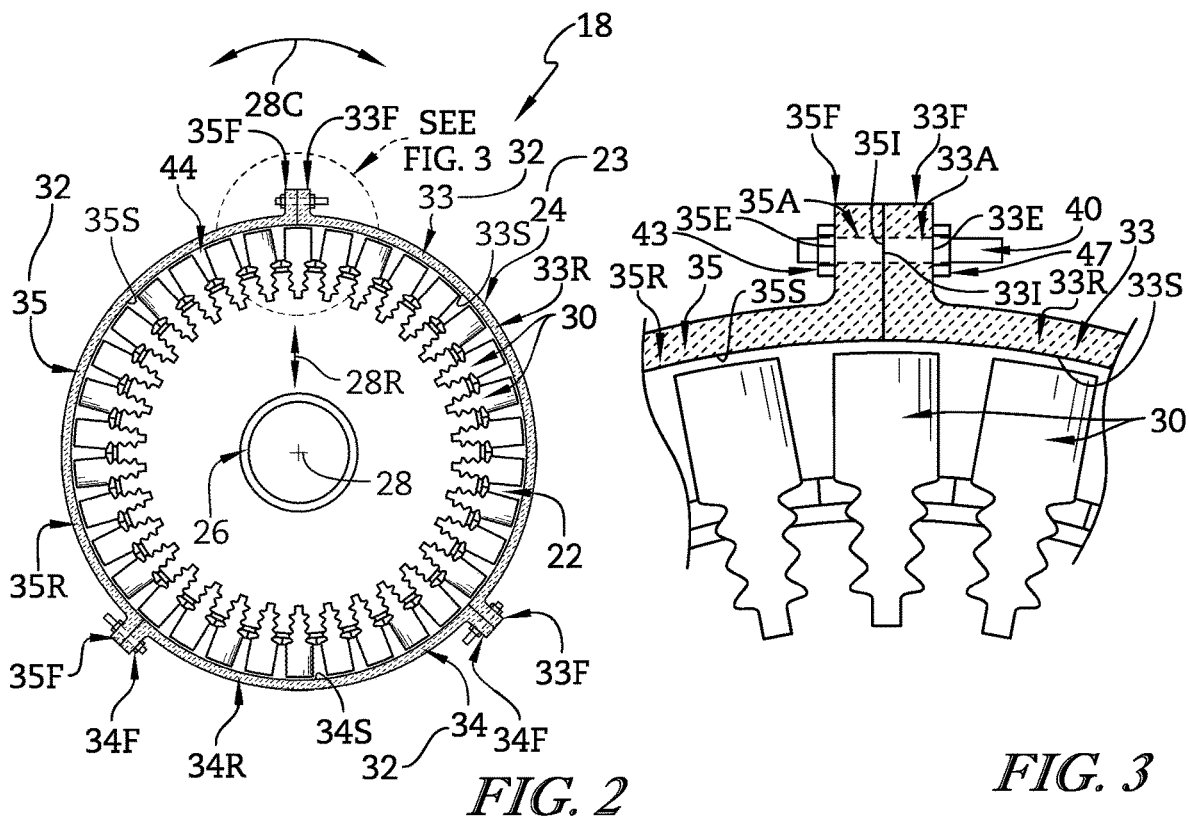
*FIG. 2*     *FIG. 3*

FULL HOOP BLADE TRACK WITH FLANGED SEGMENTS

CROSS REFERENCE TO RELATED APPLICATIONS

This application claims priority to and the benefit of U.S. Provisional Patent Application No. 62/155,237, filed 30 Apr. 2015, the disclosure of which is now expressly incorporated herein by reference.

FIELD OF THE DISCLOSURE

The present disclosure relates generally to gas turbine engines, and more specifically to blade tracks used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

The blade tracks of static shrouds may have a full hoop, single-piece construction. However, the single-piece construction of such blade tracks presents a number of manufacturing challenges. As such, alternatives constructions of blade tracks remain an area of interest.

SUMMARY

The present disclosure may comprise one or more of the following features and combinations thereof.

According to one aspect of the present disclosure, a blade track assembly for a gas turbine engine may include a plurality of ceramic matrix composite blade track segments arranged circumferentially adjacent to one another around a central axis. The blade track segments may include an arcuate runner extending in a circumferential direction around a portion of the central axis. The blade track segments may also include a pair of flanges extending outwardly in a radial direction away from the circumferential ends of the arcuate runner. Each one of the pair of flanges of each blade track segment may be coupled to a corresponding flange of a circumferentially adjacent blade track segment to resist movement of the blade track segments relative to each other.

In some embodiments, each of the pair of flanges of each blade track segment may be formed to include an aperture extending therethrough, and the aperture may receive a fastener that secures flanges of circumferentially adjacent blade track segments to each other. Additionally, in some embodiments, the blade track assembly may further comprise a retainer engaged with flanges of circumferentially adjacent blade track segments, and the retainer may be formed to include at least one aperture extending therethrough sized to receive at least one fastener. The retainer may comprise a first bracket engaged with one of the flanges of the circumferentially adjacent blade track segments and formed to include a first aperture extending therethrough, and a second bracket engaged with another of the flanges of the circumferentially adjacent blade track segments and formed to include a second aperture extending therethrough. The retainer may comprise a C-shaped clip extending over a portion of the flanges of the circumferentially adjacent blade track segments, and the retainer may be formed to include two apertures extending therethrough sized to receive at least one fastener.

In some embodiments, the pair of flanges of each of the blade track segments may be generally planar. Additionally, in some embodiments, the pair of flanges of each of the blade track segments may be generally curved when viewed along the central axis. In some embodiments still, the blade track assembly may further comprise a plurality of flange spacers, and each one of the plurality of flange spacers may be positioned between flanges of circumferentially adjacent blade track segments. Each of the pair of flanges of each blade track segment may be formed to include an aperture extending therethrough, each of the flange spacers may be formed to include an aperture extending therethrough, and the aperture of each of the flanges and the aperture of each of the flange spacers may be sized to receive a fastener. The plurality of flange spacers may be made of ceramic matrix composite material. Each of the plurality of flange spacers may be formed to include a shoulder and a neck, the shoulder may be arranged circumferentially between runners of circumferentially adjacent blade track segments, and the neck may be arranged circumferentially between flanges of circumferentially adjacent blade track segments.

In some embodiments, each flange may be formed to include a channel extending circumferentially through and radially into the flange, and the channels of the circumferentially adjacent blade track segments may be aligned. The blade track assembly may further comprise a plurality of locating keys, and each one of the locating keys may be received in the channels of the circumferentially adjacent blade track segments to locate the circumferentially adjacent blade track segments relative to one another in an axial direction parallel to the central axis. Additionally, in some embodiments, the plurality of locating keys may be made of ceramic matrix composite materials.

According to another aspect of the present disclosure, an assembly adapted for use in a gas turbine engine may comprise a plurality of ceramic matrix composite material segments and a plurality of ceramic matrix composite material connectors. The plurality of ceramic matrix composite material segments may be arranged circumferentially adjacent to one another around a central axis. Each of the ceramic matrix composite material segments may include an arcuate surface extending in a circumferential direction around a portion of the central axis. Each of the ceramic matrix composite material segments may also include a plurality of flanges extending outwardly in a radial direction away from the arcuate surface. The plurality of ceramic matrix composite material connectors may be received by flanges of circumferentially adjacent ceramic matrix composite material segments to secure circumferentially adjacent ceramic matrix composite segments to one another.

In some embodiments, each of the plurality of flanges may be formed to include a channel extending circumferentially through the flange, and each of the plurality of ceramic matrix composite material connectors may be received in the channels of circumferentially adjacent ceramic matrix composite material segments. When one of the plurality of connectors is received in the channels of circumferentially adjacent ceramic matrix composite material segments, an interference fit may be formed between the one of the connectors and the circumferentially adjacent ceramic matrix composite material segments.

According to yet another aspect of the present disclosure, an assembly may comprise a first component, a second component, and a fastener. The first component may consist essentially of ceramic matrix composite material. The first component may have an external face and an internal face opposite the external face. The second component may consist essentially of ceramic matrix composite material. The second component may have an external face and an internal face opposite the external face arranged in confronting relation with the internal face of the first component. The fastener may consist of essentially ceramic matrix composite material. The fastener may extend through the first component and the second component to couple the first component and the second component. The fastener may include a first flared head that extends into the first component from the external face toward the internal face. The fastener may also include a second flared head that extends into the second component from the external face toward the internal face. The fastener may also include a body that extends through the internal faces of the first and second components and interconnects the first flared head and the second flared head.

In some embodiments, the body may interconnect the first flared head at a first neck of the fastener, the body may interconnect the second flared head at a second neck of the fastener, and the first and second flared heads may extend outwardly in an axial direction from the respective first and second necks toward the respective external faces of the first and second components. Additionally, in some embodiments, the fastener may comprise a plurality of strands including ceramic-containing reinforcement fibers that extend through the first and second components from the external face of the first component to the external face of the second component.

These and other features of the present disclosure will become more apparent from the following description of the illustrative embodiments.

BRIEF DESCRIPTION OF THE DRAWINGS

FIG. 1 is a cut-away perspective view of a gas turbine engine;

FIG. 2 is a front elevation view of a blade track included in the turbine of the gas turbine engine of FIG. 1 showing that the blade track has a plurality of blade track segments coupled to one another via flanges of the blade track segments;

FIG. 3 is detail view of the blade track of FIG. 2 showing flanges of two blade track segments coupled to one another by a fastener;

DETAILED DESCRIPTION OF THE DRAWINGS

Figure 4:
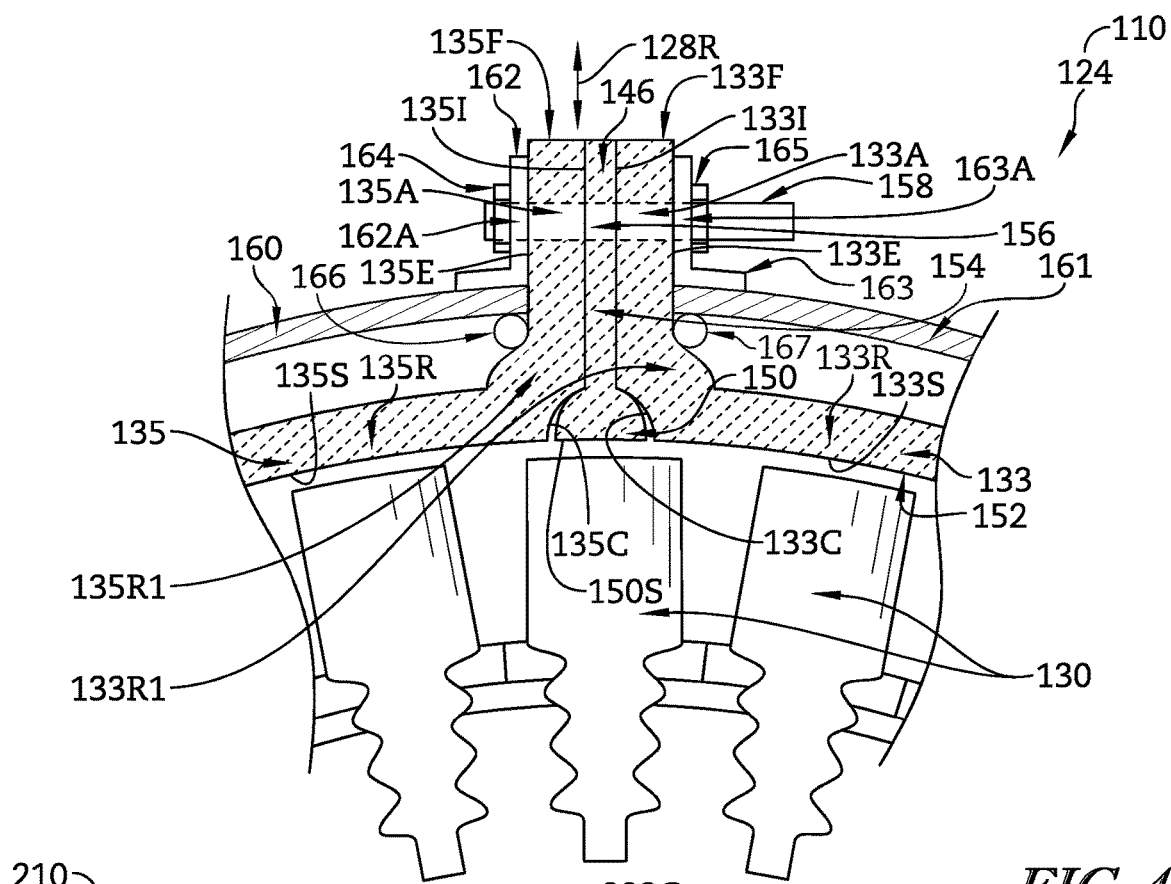
FIG. 4 is a detail view similar to FIG. 3 showing flanges of two blade track segments of a blade track of another gas turbine engine coupled to one another via a fastener.

For the purposes of promoting an understanding of the principles of the disclosure, reference will now be made to a number of illustrative embodiments illustrated in the drawings and specific language will be used to describe the same.

Referring now to FIG. 1, an illustrative aerospace gas turbine engine 10 is cut-away to show that the engine 10 includes a fan 12, a compressor 14, a combustor 16, and a turbine 18 all mounted to a case 20. The fan 12 is driven by the turbine 18 to provide thrust. The compressor 14 compresses and delivers air to the combustor 16. The combustor 16 mixes fuel with the compressed air received from the compressor 14 and ignites the fuel to produce hot, high-pressures gas. The hot, high-pressure gas produced from burning fuel in the combustor 16 is directed into the turbine 18, and the turbine 18 extracts work to drive the compressor 14 and the fan 12.

Referring now to FIG. 2, the turbine 18 illustratively includes a turbine wheel assembly 22 and a turbine shroud 23 that has a blade track 24. The turbine wheel assembly 22 is adapted for rotation about a central axis 28 and includes a disk 26 and blades 30 coupled to the disk 26. The blade track 24 includes a number of ceramic matrix composite blade track segments 32 that are arranged circumferentially adjacent to one another around the axis 28. Combustion products directed to the turbine 18 from the combustor 16 push the blades 30 to rotate about the axis 28. The blade track 24 extends around the turbine wheel assembly 22 to block combustion products from passing over the blades 30 without pushing the blades 30 to rotate about the axis 28.

The blade track segments 32 illustratively include substantially identical blade track segments 33, 34, 35 that are arranged circumferentially adjacent to one another around the axis 28 as shown in FIG. 2. The segments 33, 34, 35 include respective arcuate runners 33R, 34R, 35R and respective generally planar flange pairs 33F, 34F, 35F. The arcuate runners 33R, 34R, 35R extend in a circumferential direction indicated by arrow 28C around a portion of the axis 28. The flange pairs 33F, 34F, 35F extend outwardly in a radial direction indicated by arrow 28R away from circumferential ends of the respective runners 33R, 34R, 35R that are arranged opposite one another. One flange of each segment 32 is coupled to a corresponding flange of a circumferentially adjacent blade track segment 32 to resist movement of the blade track segments 32 relative to each other.

Radially inward surfaces 33S, 34S, 35S of the segments 33, 34, 35 cooperate to define an annular flowpath surface 44 as shown in FIG. 2. The flowpath surface 44 extends parallel to the axis 28 and confronts the blades 30. Combustion products that push the blades 30 to cause the blades 30 to rotate about the axis 28 travel aftward along the flowpath surface 44. The flowpath surface 44 may be machined to achieve a desired degree of contact, or lack thereof, between the surface 44 and the blades 30, and therefore a desired performance during operation of the engine 10. Additionally, the flowpath surface 44 may be machined to achieve a desired curvature.

In some embodiments, a coating such as, for example, an environmental barrier coating or an abradable coating may be applied to the surface 44 following assembly of the segments 32 or to the surfaces 33S, 34S, 35S prior to assembly of the segments 32. In those embodiments, following assembly of the segments 32, the coating applied to the segments 32 may be machined to achieve the desired degree of contact, or lack thereof, between the surface 44 and the blades 30. Additionally, the coating applied to the segments 32 may be machined to achieve a desired curvature. In other embodiments, maintaining a desired degree of contact between the surface 44 and the blades 30 may not be necessary. As such, in those embodiments, machining of the flowpath surface 44 may not be required following assembly of the segments 32.

In the illustrative embodiment, the blade track 24 includes the three segments 33, 34, 35 that are assembled together to form the full hoop blade track 24. In other embodiments, however, the blade track may include fewer or more blade track segments that are assembled together to form the full hoop blade track.

In the illustrative embodiment, the blade track segments 33, 34, 35 extend parallel to the axis 28 so that the blade track segments 33, 34, 35 have substantially constant cross-sections along the axis 28 as suggested by FIG. 2. In other embodiments, however, the segments 33, 34, 35 may not have substantially constant cross-sections along the axis 28. In such embodiments, the blade track segments may include additional features such as, for example, conical portions or ribs.

In the illustrative embodiment, the blade track 24 is supported to extend about the axis 28 and around the blades 30 by the case 20 as suggested by FIGS. 1-2. The blade track 24 may be coupled to a carrier of the turbine 18 that is also coupled to the case 20 so that the blade track 24, the carrier, and the case 20 are concentric about the axis 28. To maintain that concentric relationship when thermal expansion and contraction occurs during operation of the engine 10, the blade track 24 may be cross-keyed to the carrier, or directly to the case 20. In one example, the blade track 24 may be cross-keyed to the carrier or directly to the case 20 via features separate from the flanges 33F, 34F, 35F of the segments 33, 34, 35. In another example, the blade track 24 may be cross-keyed to the carrier or directly to the case 20 via the flanges 33F, 34F, 35F.

Referring now to FIG. 3, one flange of each of the flange pairs 33F, 35F of the circumferentially adjacent segments 33, 35 are illustratively coupled to one another to resist movement of the segments 33, 35 relative to each other. The blade track segments 33, 34, 35 are coupled to one another in identical fashion to the segments 33, 35 as shown in FIGS. 2-3.

The flanges 33F, 35F are formed to include respective apertures 33A, 35A as shown in FIGS. 2-3. The aperture 33A extends through an internal face 331 and an external face 33E that is arranged opposite the internal face 331. The aperture 35A extends through an internal face 351 and an external face 35E that is arranged opposite the internal face 351. The internal faces 331, 351 are engaged with each other so that the apertures 33A, 35A are aligned. The apertures 33A, 35A receive a fastener 40 that secures the flanges 33F, 35F, and thus the segments 33, 35, together. Nuts 43, 47 are threaded on to the fastener 40 and engage the respective external faces 33E, 35E of the flanges 33, 35.

In the illustrative embodiment, the fasteners 40 and the nuts 43, 47 are metallic components. In other embodiments, however, the fasteners 40 and the nuts 43, 47 may have other suitable constructions. In one example, the fasteners 40 and the nuts 43, 47 may have a construction similar to the fasteners and other components described in NASA Tech Memo TM-100611, entitled "Thermal Stress in High Temperature Cylindrical Fasteners," the entirety of which is hereby incorporated by reference. In another example, the fasteners 40 and the nuts 43, 47 may have a construction similar to the fasteners and other components described in NASA Technical Paper 2226, entitled "Theoretical Basis for Design of Thermal-Stress-Free Fasteners," the entirety of which is hereby incorporated by reference.

In other embodiments, other suitable fasteners may be used to secure the segments 32 to one another to form the blade track 24. One such fastener is disclosed in U.S. application Ser. No. 14/104,694, entitled "Bi-Metal Fastener for Thermal Growth Compensation," the entirety of which is hereby incorporated by reference. Another such fastener is disclosed in U.S. Pat. No. 7,988,395, entitled "Mechanical Fastener System for High-Temperature Structural Assemblies," the entirety of which is hereby incorporated by reference.

Referring now to FIG. 4, a portion of another blade track 124 is shown. The blade track 124 is configured for use in gas turbine engine 110 and is substantially similar to the blade track 24 shown in FIGS. 2-3 and described herein. In the illustrative blade track 124, one flange of each of the flange pairs 133F, 135F of the circumferentially adjacent ceramic matrix composite segments 133, 135 are coupled to one another to resist movement of the segments 133, 135 relative to one another like the segments 33, 35 of the blade track 24. Unlike the blade track 24, the blade track 124 includes a plurality of flange spacers 146, one of which is positioned between the flanges 133F, 135F of the segments 133, 135. Also unlike the blade track 24, metallic liners 160, 161 are engaged with and extend between the flanges 133F, 135F of the respective segments 133, 135.

One flange of each of the flange pairs 133F, 135F are illustratively coupled to one another through the flange spacer 146 as shown in FIG. 4. In the illustrative embodiment, the flange spacers 146 are constructed of a ceramic-containing material such as, for example, ceramic matrix composite material. In other embodiments, the flange spacers 146 may be constructed of other suitable materials, such as, for example, one or more metallic materials. Additionally, in the illustrative embodiment, the flange spacers 146 may be adapted to couple to a case of the engine 110 so that the blade track 124 is supported by the case.

The flange spacer 146 illustratively includes a shoulder 150 as suggested by FIG. 4. The shoulder 150 of the flange spacer 146 is arranged circumferentially between respective runners 133R, 135R of the segments 133, 135 so that the runners 133R, 135R are seated against the shoulder 150. Specifically, convex surfaces 133C, 135C of the runners 133R, 135R are seated against the generally curved shoulder 150 of the flange spacer 146. Radially inward surfaces 133S, 135S of the respective segments 133, 135 and a radially inward surface 150S of the shoulder 150 cooperate to define a portion of an annular flowpath surface 152 as shown in FIG. 4. The flowpath surface 152 extends parallel to the central axis of the engine 110 and confronts the blades 130.

The flange spacer 146 also illustratively includes a neck 154 that is interconnected with the shoulder 150 as shown in FIG. 4. The neck 154 of the flange spacer 146 is arranged circumferentially between corresponding flanges 133F, 135F so that the neck 154 is engaged with internal faces 133I, 135I of the flanges 133F, 135F. Like the flanges 133F, 135F of the segments 133, 135, the neck 154 of the flange spacer 146 is generally planar.

The flanges 133F, 135F are illustratively formed to include respective apertures 133A, 135A as shown in FIG. 4. The aperture 133A extends through the internal face 133I and an external face 133E that is arranged opposite the internal face 133I. The aperture 135A extends through the internal face 135I and an external face 135E that is arranged opposite the internal face 135I. The flange spacer 146 is formed to include an aperture 156 that extends therethrough. The internal faces 133I, 135I of the respective flanges 133F, 135F are engaged with the neck 154 of the flange spacer 146 so that the apertures 133A, 135A, 156 are aligned. The apertures 133A, 135A, 156 receive a fastener 158 that secures the flanges 133F, 135F and the flange spacer 146 together so that the segments 133, 135 are secured together.

L-shaped brackets 162, 163, which may be referred to collectively herein as a retainer, are illustratively engaged with the respective external faces 133E, 135E of the segments 133, 135 and respective metallic liners 160, 161 as shown in FIG. 4. The brackets 162, 163 are engaged with the external faces 133E, 135E and the liners 160, 161 so that respective apertures 162A, 163A formed in the brackets 162, 163 are aligned with the apertures 133A, 135A, and 156. The apertures 162A, 163A, along with the apertures 133A, 135A, 156, receive the fastener 158. Nuts 164, 165 are threaded on to the fastener 158 and are engaged with respective brackets 162, 163.

Metallic liners 160, 161 illustratively extend between the flanges 133F and the flanges 135F of the respective segments 133, 135 to engage the flanges 133F, 135F, respective brackets 162, 163, and respective seals 166, 167 as shown in FIG. 4. The liners 160, 161 may be used to direct cooling air to the portions of the blade track 124 that are positioned outward of the flowpath surface 152 in the radial direction indicated by the arrow 128R. For instance, the liners 160, 161 may be used to direct cooling air to, and thereby manage the thermal expansion and contraction of, the flanges 133F, 135F, the flange spacer 146, the fastener 158, the nuts 164, 165, and the brackets 162, 163 during operation of the engine 110. The liners 160, 161 may also be used to manage pressure loads applied to the flanges 133F, 135F during operation of the engine 110. The liners 160, 161 may be incorporated between the flanges 33F, 34F, 35F of the blade track segments 33, 34, 35 of the blade track 24 described herein and shown in FIGS. 2-3.

Seals 166, 167 are illustratively positioned between the liner 160 and the flange 133F and between the liner 161 and the flange 135F, respectively, as shown in FIG. 4. The seal 166 is positioned between the liner 160 and the flanges 133F so that the seal 166 is engaged with the liner 160 and a generally arcuate ramp 133R1 of the flange 133F. The seal 167 is positioned between the liner 161 and the flange 135F so that the seal 167 is engaged with the liner 161 and a generally arcuate ramp 135R1 of the flange 135F. The seals 166, 167 may be embodied as, or otherwise include, rope seals. The seal 166, 167 may be embodied as, or otherwise include, other suitable seals such as, for example, omega seals.

Figure 5:
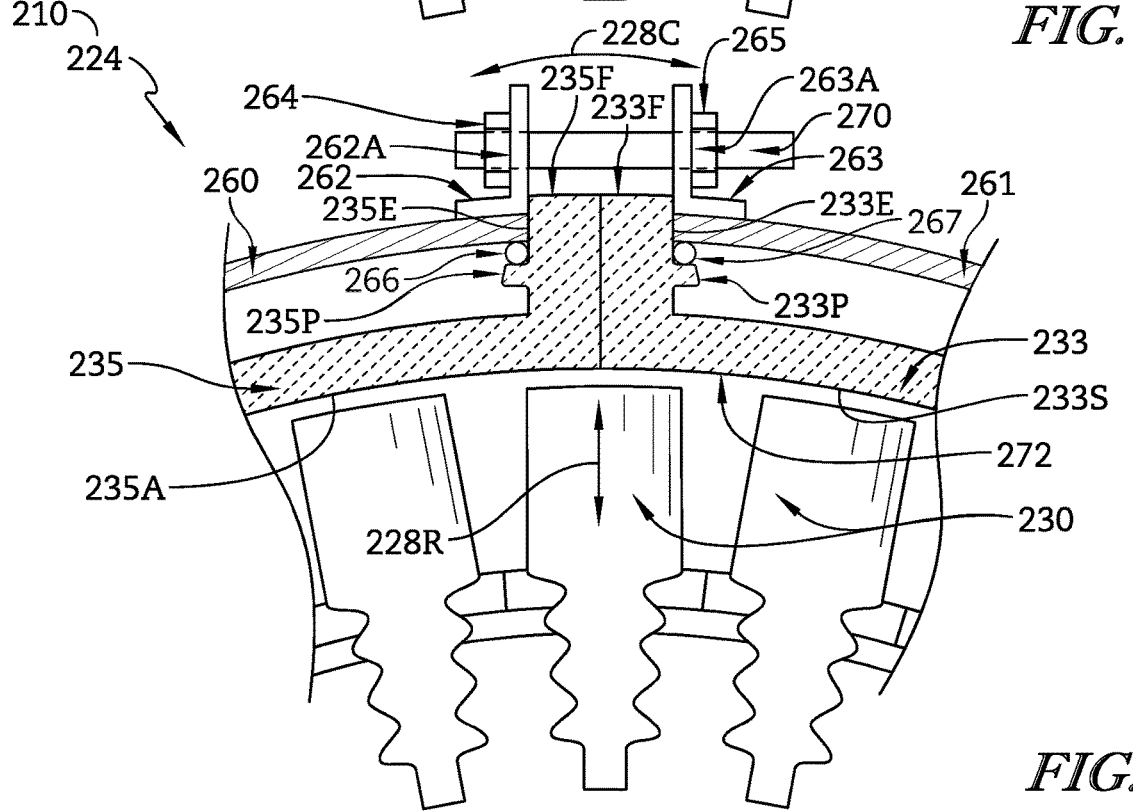
FIG. 5 is a detail view similar to FIG. 3 showing flanges of two blade track segments of a blade track of yet another gas turbine engine coupled to one another via a fastener.

Referring now to FIG. 5, a portion of another blade track 224 is shown. The blade track 224 is configured for use in gas turbine engine 210 and is substantially similar to the blade track 124 shown in FIG. 4 and described herein. In the illustrative blade track 224, one flange of each of the flange pairs 233F, 235F of the circumferentially adjacent ceramic matrix composite segments 233, 235 are coupled to one another to resist movement of the segments 233, 235 relative to one another like the segments 133, 135 of the blade track 124. Unlike the blade track 124, a fastener 270 used to secure the flanges 233F, 235F does not pass through the flanges 233F, 235F. Also unlike the blade track 124, the flanges 233F, 235F are coupled directly to each other without a component interposed therebetween.

The flanges 233F, 235F of the segments 233, 235 do not include apertures sized to receive a fastener as shown in FIG. 5. Additionally, the flanges 233F, 235F are generally planar and do not include features similar to the arcuate ramps 133R1, 135R1 of the segments 133, 135. The flanges 233F, 235F include respective projections 233P, 235P that extend outward from respective external faces 233E, 235E in the circumferential direction indicated by arrow 228C. Radially inward surfaces 233S, 235S of the respective segments 233, 235 cooperate to define a portion of an annular flowpath surface 272. The flowpath surface 272 extends parallel to the central axis of the engine 210 and confronts the blades 230.

L-shaped brackets 262, 263, which may be referred to collectively herein as a retainer, are illustratively engaged with the respective external faces 233E, 235E of the segments 233, 235 and respective metallic liners 260, 261 as shown in FIG. 5. Specifically, the brackets 262, 263 are engaged with the external faces 233E, 235E and the liners 260, 261 so that respective apertures 262A, 263A formed in the brackets 262, 263 are located outward from the flanges 233F, 235F in the radial direction indicated by arrow 228R are aligned. The apertures 262A, 263A receive the fastener 270. Nuts 264, 265 are threaded on to the fastener 270 and are engaged with respective brackets 262, 263.

In the illustrative embodiment, little or no torque load is applied by the brackets 262, 263 to the flanges 233F, 235F to clamp the flanges 233F, 235F together. In other embodiments, the brackets 262, 263 may include features that enable the brackets 262, 263 to apply a torque load to the flanges 233F, 235F. In one example, one or both of the brackets 262, 263, or even a spacer component separate from the brackets 262, 263, may include or provide an extension that spans the gap between the brackets 262, 263 in the direction indicated by arrow 228C so that the brackets 262, 263 extend outward in the direction indicated by arrow 228R at an angle to the faces 233E, 235E. A torque load urging the brackets 262, 263 toward the extension may be transmitted to the flanges 233F, 235F to clamp the flanges 233F, 235F together. A gap between the brackets 262, 263 and the extension may be set to control the torque load urging the brackets 262, 263 toward the extension. As such, the clamp load applied to the flanges 233F, 235F by the brackets 262, 263 may be controlled somewhat independently of the torque load applied to the flanges 233F, 235F.

Metallic liners 260, 261 illustratively extend between respective flanges 233F and the flanges 235F of the segments 233, 235 to engage the flanges 233F, 235F, respective brackets 262, 263, and respective seals 266, 267 as suggested by FIG. 5. The liners 260, 261 may be used to direct cooling air to the portions of the blade track 224 that are positioned outward of the flowpath surface 272 in the direction of the arrow 228R. For instance, the liners 260, 261 may be used to direct cooling air to, and thereby manage the thermal expansion and contraction of, the flanges 233F, 235F, the fastener 270, the nuts 264, 265, and the brackets 262, 263 during operation of the engine 210. The liners 260, 261 may also be used to manage pressure loads applied to the flanges 233F, 235F during operation of the engine 210.

Seals 266, 267 are illustratively positioned between the liner 260 and the flange 233F and between the liner 261 and the flange 235F, respectively, as shown in FIG. 5. The seal 266 is positioned between the liner 260 and the flange 233F so that the seal 266 is engaged with the liner 260 and the projection 233P of the flange 233F. The seal 267 is positioned between the liner 261 and the flange 235F so that the seal 267 is engaged with the liner 261 and the projection 235P of the flange 235F. The seals 266, 267 may be embodied as, or otherwise include, rope seals. The seal 266, 267 may be embodied as, or otherwise include, other suitable seals such as, for example, omega seals.

Figure 6:
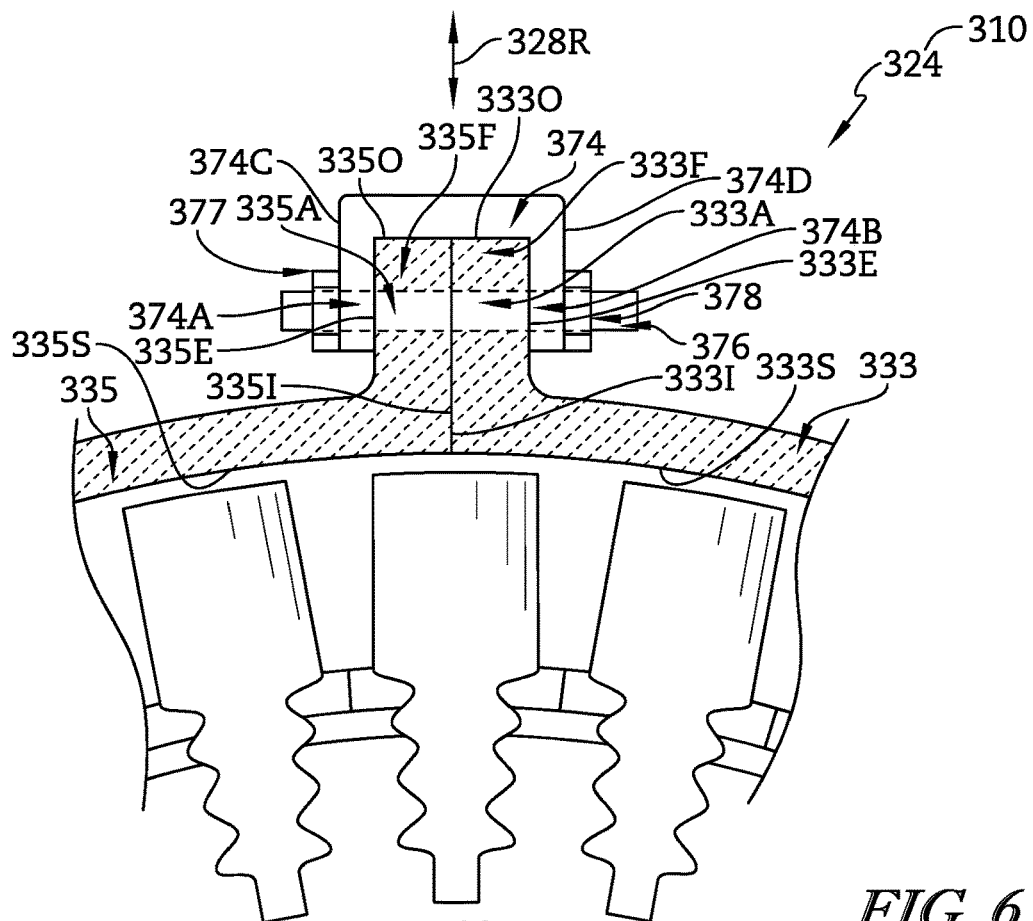
FIG. 6 is a detail view similar to FIG. 3 showing flanges of two blade track segments of a blade track of yet another gas turbine engine still coupled to one another via a fastener.

Referring now to FIG. 6, a portion of another blade track 324 is shown. The blade track 324 is configured for use in gas turbine engine 310 and is substantially similar to the blade track 24 shown in FIGS. 2-3 and described herein. In the illustrative blade track 324, one flange of each of the flange pairs 333F, 335F of the circumferentially adjacent ceramic matrix composite material segments 333, 335 are coupled to one another to resist movement of the segments 333, 335 relative to one another like the segments 33, 35. Unlike the blade track 24, the blade track 324 includes a number of C-shaped clips 374, one of which extends over portions of the flanges 333F, 335F to couple the flanges 333F, 335F together.

The generally planar flanges 333F, 335F are illustratively formed to include respective apertures 333A, 335A as shown in FIG. 6. The aperture 333A extends through an internal face 3331 and an external face 333E that is arranged opposite the internal face 3331. The internal face 3331 and external face 333E are interconnected by a radially outward surface 3330 that is arranged opposite the radially inward surface 333S of the segment 333. The aperture 335A extends through an internal face 3351 and an external face 335E that is arranged opposite the internal face 3351. The internal face 3351 and external face 335E are interconnected by a radially outward surface 3350 that is arranged opposite the radially inward surface 335S of the segment 335.

The C-shaped clip 374, which may also be referred to herein as a retainer, illustratively extends over and is engaged with the radially outward surfaces 3330, 3350 and portions of the external faces 333E, 335E of the flanges 333F, 335F as shown in FIG. 6. The C-shaped clip 374 is formed to include apertures 374A, 374B that extend therethrough. The C-shaped clip 374 is engaged with the flanges 333F, 335F so that the apertures 374A, 374B, 333A, 335A are aligned. The apertures 374A, 374B, 333A, 335A receive a fastener 376 that secures the C-shaped clip 374 and the flanges 333F, 335F, and thus the segments 333, 335, together. Nuts 377, 378 are threaded on to the fastener 376 and engage faces 374C, 374D of the clip 374 that are arranged opposite of one another, respectively.

In the illustrative embodiment, the C-shaped clips 374 are metallic components. The metallic C-clip 374 applies a load to the flanges 333F, 335F to clamp the flanges 333F, 335F together and thereby resist movement of the flanges 333F, 335F relative to one another in the radial direction indicated by arrow 328R. In other embodiments, the clips 374 may have another suitable construction.

Figure 7:
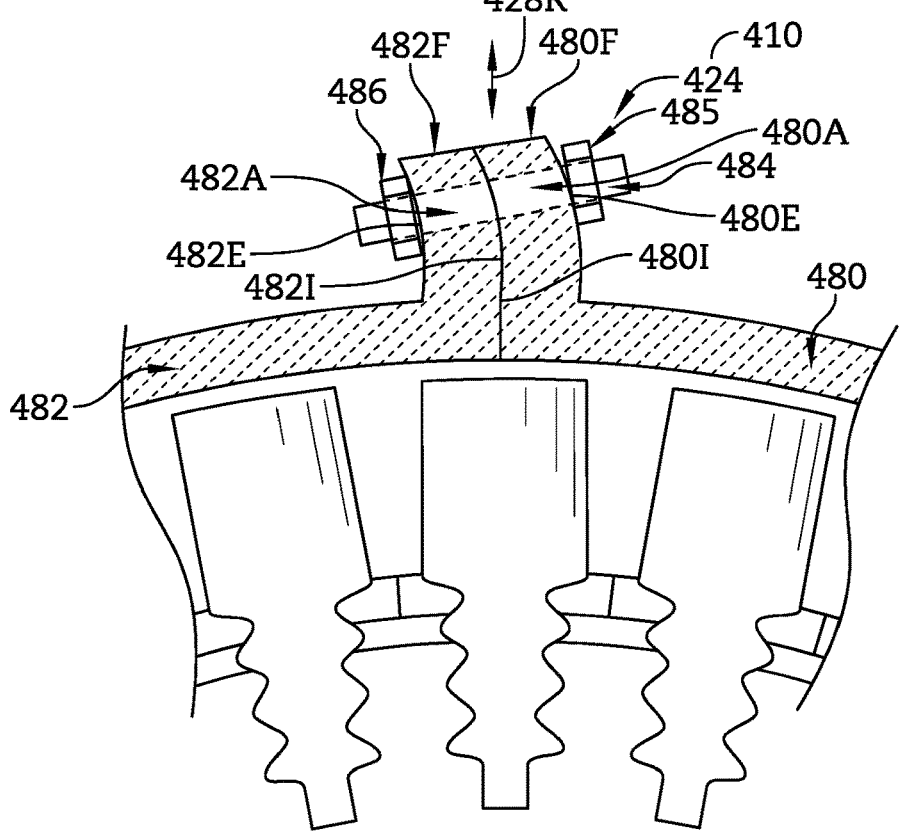
FIG. 7 is a detail view similar to FIG. 3 showing flanges of two blade track segments of a blade track of one more gas turbine engine coupled to one another via a fastener.

Referring now to FIG. 7, a portion of another blade track 424 is shown. The blade track 424 is configured for use in gas turbine engine 410 and is substantially similar to the blade track 24 shown in FIGS. 2-3 and described herein. In the illustrative blade track 424, one flange of each of the flange pairs 480F, 482F of the circumferentially adjacent ceramic matrix composite material segments 480, 482 are coupled to one another to resist movement of the segment 480, 482 relative to one another like the segments 33, 35. Unlike the blade track 24, the flanges of each flange pair 480F, 482F are generally curved when viewed along a central axis of the engine 410. In the illustrative blade track 424, compound curvature between the segments of the blade track 424 may be used to locate the segments of the blade track 424 relative to one another in the radial direction indicated by arrow 428R.

The flanges 480F, 482F are illustratively formed to include respective apertures 480A, 482A as shown in FIG. 7. The aperture 480A extends through an internal face 4801 and an external face 480E that is arranged opposite the internal face 4801. The aperture 482A extends through an internal face 4821 and an external face 482E that is arranged opposite the internal face 4821. The internal faces 4801, 4821 are engaged with each other so that the apertures 480A, 482A are aligned. The apertures 480A, 482A receive a fastener 484 that secures the flanges 480F, 482F, and thus the segments 480, 482, together. Nuts 485, 486 are threaded on to the fastener 484 and engage the external faces 480E, 482E of the flanges 480F, 482F, respectively. In some embodiments, washers each having a curved surface complementary to the faces 480E, 482E and a flat surface complementary to the nuts 485, 486 may be positioned between the flanges 480F, 482F and the nuts 485, 486. In other embodiments, rather than using washers, the curved faces 480E, 482E may be counterbored to provide flat surfaces against which the nuts 485, 486 may rest.

Figure 8:
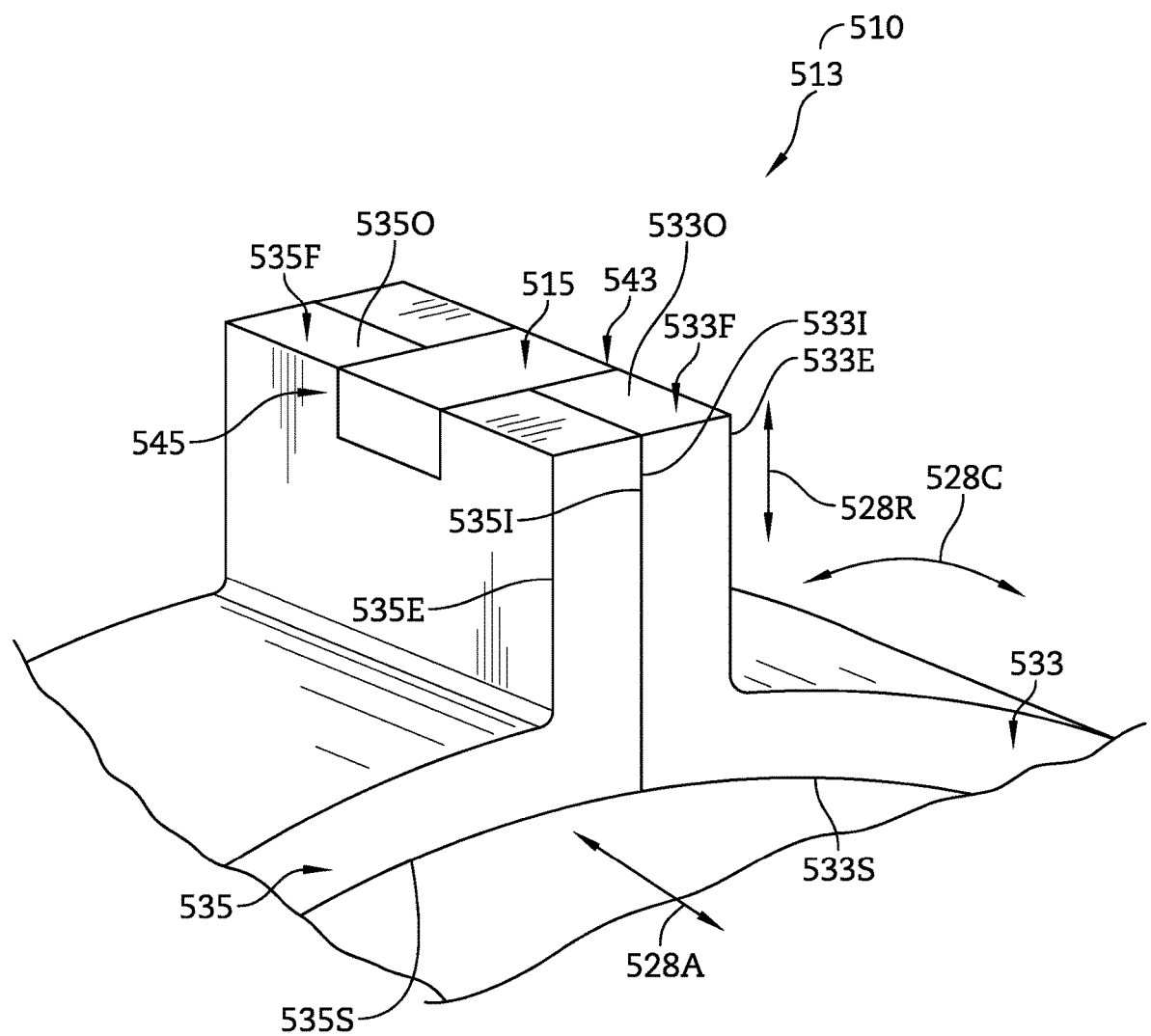
FIG. 8 is a perspective view of an assembly showing flanges of two ceramic matrix composite material segments coupled to one another by a locating key.

Referring now to FIG. 8, a portion of an assembly 513 is shown. The assembly 513 is configured for use in gas turbine engine 510. In one example, the assembly 513 may be embodied as, or otherwise included in, a blade track used in the engine 510. In another example, the assembly 513 may be embodied as, or otherwise included in, another component of the gas turbine engine 510.

The assembly 513 illustratively includes ceramic matrix composite material segments 533, 535 as shown in FIG. 8 that are substantially similar to the segments 33, 35 of the blade track 24 shown in FIGS. 2-3 and described herein. In the illustrative assembly 513, flanges 533F, 535F of the circumferentially adjacent segments 533, 535 are coupled to each other via a locating key 515. The locating key 515 locates the segments 533, 535, relative to one another in an axial direction indicated by the arrow 528A.

The flanges 533F, 535F of the segments 533, 535 are illustratively formed to include respective channels 543, 545 as shown in FIG. 8. The channels 543, 545 extend through respective flanges 533F, 535F in the circumferential direction indicated by arrow 528C and into the flange 533F, 535F in the radial direction indicated by arrow 528R. The channel 543 extends in the direction of the arrow 528C through an internal face 5331 and an external face 533E that is arranged opposite the internal face 5331. The channel 543 extends in the direction of the arrow 528R through a radially-outward surface 5330 that interconnects the faces 5331, 533E and toward a radially-inward surface 533S that is arranged opposite the surface 5330. The channel 545 extends in the direction of the arrow 528C through an internal face 5351 and an external face 535E that is arranged opposite the internal face 5351. The channel 545 extends in the direction of the arrow 528R through a radially-outward surface 5350 that interconnects the faces 5351, 535E and toward a radially-inward surface 535S that is arranged opposite the surface 5350.

The locating key 515 is illustratively sized to be received in the channels 543, 545 when the internal faces 5331, 5351 of the segments 533, 535 are engaged so that the channels 543, 545 are aligned as shown in FIG. 8. The locating key 515 permits the segments 533, 535 to be located relative to one another in the direction of the arrow 528A prior to brazing the segments 533, 535 or co-processing the segments 533, 535.

In the illustrative embodiment, the channels 543, 545 extend entirely through the thickness of the segments 533, 535 in the direction of the arrow 528C as shown in FIG. 8. Additionally, in the illustrative embodiment, the locating key 515 is constructed of ceramic matrix composite material. In some embodiments, the channels 543, 545 may extend only partway through the thickness of the segments 533, 535 in the direction of the arrow 528C. In some other embodiments, the locating key 515 may have another suitable construction.

Figure 9:
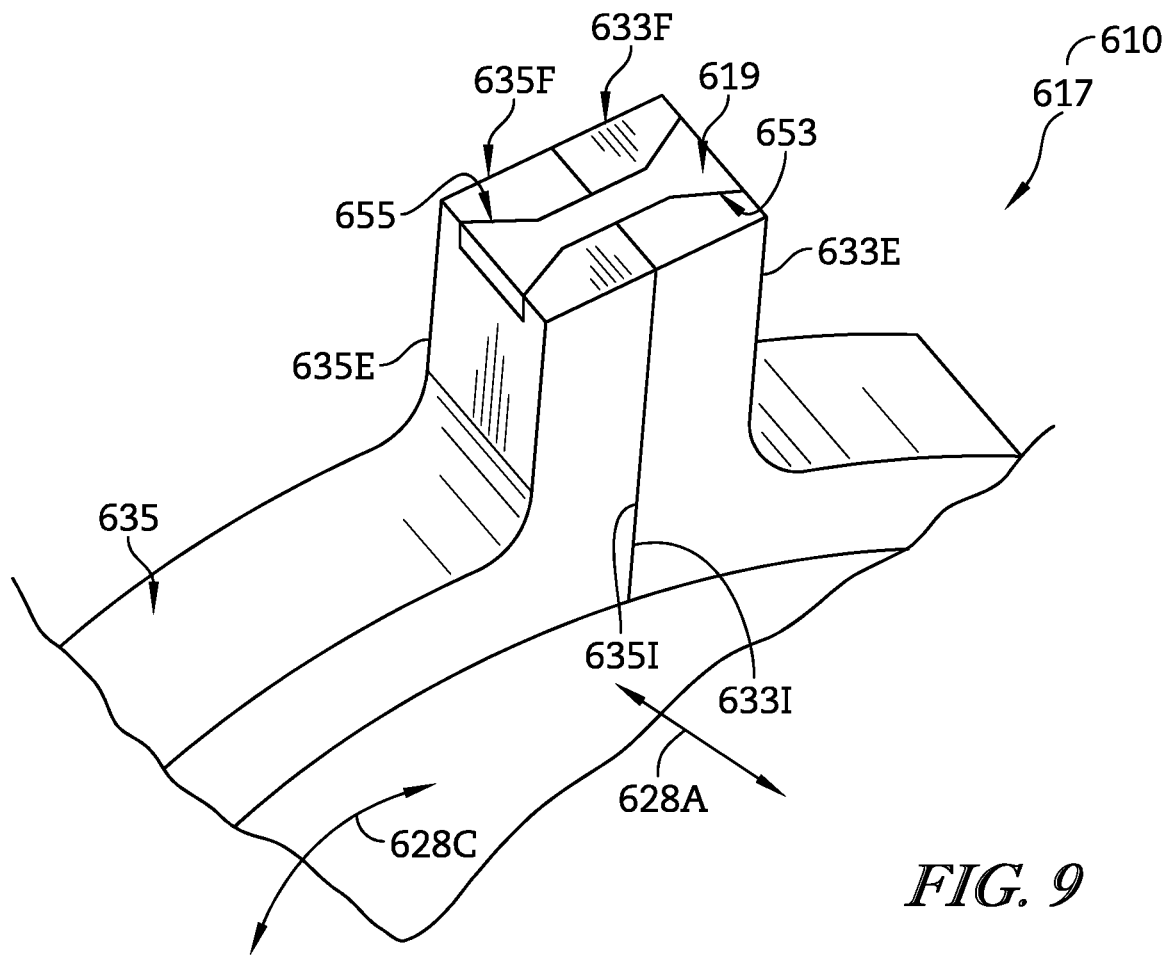
FIG. 9 is a perspective view showing two ceramic matrix composite material components of another assembly coupled together via a ceramic matrix composite material fastener.

Referring now to FIG. 9, a portion of another assembly 617 is shown. The assembly 617 is configured for use in gas turbine engine 610. In one example, the assembly 617 may be embodied as, or otherwise included in, a blade track used in the engine 610. In another example, the assembly 617 may be embodied as, or otherwise included in, another component of the gas turbine engine 610.

The assembly 617 illustratively includes ceramic matrix composite segments 633, 635 as shown in FIG. 9 that are substantially similar to the segments 33, 35 of the blade track 24 shown in FIGS. 2-3 and described herein. In the illustrative assembly 617, flanges 633F, 635F of the circumferentially adjacent segments 633, 635 are coupled to each other via a connector 619, also referred to herein as a fastener. The connector 619 secures the segments 633, 635, to one another.

The flanges 633F, 635F of the segments 633, 635 are illustratively formed to include respective channels 653, 655 as shown in FIG. 9. The channels 653, 655 extend through respective flanges 633F, 635F in the circumferential direction indicated by arrow 628C. The channel 653 extends in the direction of the arrow 628C through an internal face 6331 and an external face 633E that is arranged opposite the internal face 6331. The channel 655 extends in the direction of the arrow 628C through an internal face 6351 and an external face 635E that is arranged opposite the internal face 6351.

The connector 619 is illustratively sized to be received in the channels 653, 655 when the internal faces 6331, 6351 of the segments 633, 635 are engaged so that the channels 653, 655 are aligned as shown in FIG. 9. The channels 653, 655 therefore cooperate to define a shape sympathetic to the shape of the connector 619. When the connector 619 is received in the aligned channels 653, 655, the connector 619 secures the segments 633, 635 to one another.

In the illustrative embodiment, once the connector 619 is received by the channels 653, 655 of the segment 633, 635, an interference fit is formed between the connector 619 and the segments 633, 635 as suggested by FIG. 9. The interference fit resists movement of the connector 619 out of the channels 653, 655 and establishes a preload that urges the segments 633, 635 together. In other embodiments, however, the connector 619 may be received by the segments 633, 635 without an interference fit. In one such embodiment, for instance, the segments 633, 635 and the connector 619 may be partially processed, the connector 619 may be received by the segments 633, 635 without an interference fit, and the segments 633, 635 and the connector 619 may be further processed together to secure the segments 633, 635 to each other.

Figure 10:
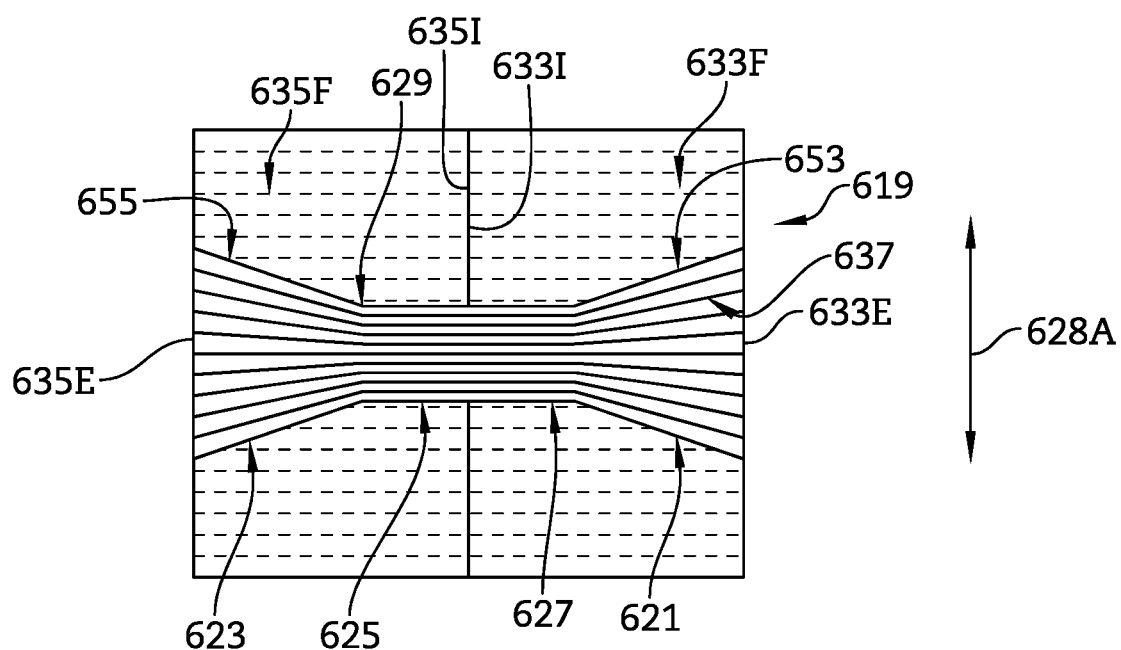
FIG. 10 is a detail view of the fastener of FIG. 9 showing that strands of ceramic reinforcement included in the ceramic matrix composite material fastener are flexed at opposite ends to affix the two components together.

Referring now to FIGS. 9-10, the fastener 619 illustratively includes a flared head 621, a flared head 623, and a body 625 that interconnects the flared heads 621, 623. The flared head 621 extends into the segment 633 from the external face 633E toward the internal face 6331. The flared head 623 extends into the segment 635 from the external face 635E toward the internal face 6351. The body 625 extends through the internal faces 6331, 6351 to interconnect the flared heads 621, 623.

Referring still to FIGS. 9-10, the fastener 619 further illustratively includes necks 627, 629. The body 625 interconnects the flared head 621 at the neck 627, and the body 625 interconnects the flared head 623 at the neck 629. The flared heads 621, 623 each extend outwardly in the axial direction indicated by the arrow 628A from the respective necks 627, 629 toward the respective faces 633E, 635E.

Referring now to FIG. 10, the fastener 619 illustratively has a bow-tie-like shape. The flared heads 621, 623 may have a substantially trapezoidal or triangular cross-sectional shape, and the body 625 may have a substantially rectangular cross-sectional shape.

The connector 619 is illustratively constructed of ceramic matrix composite material as suggested by FIG. 10. The connector 619 includes a number of strands 637 that have ceramic-containing reinforcement fibers that extend through the segments 633, 635 from the external face 633E to the external face 635E. In other embodiments, however, the connector 619 may have another suitable construction.

To take advantage of the high temperature capability of ceramic matrix composite (CMC) material and improve specific fuel consumption (SFC), a full hoop CMC blade track may be provided. Because the full hoop blade track may eliminate gaps between traditional seal segments interposed between segments of a non-full-hoop blade track, the cooling and leakage air flow rates may be significantly reduced, and SFC may be improved as a result.

One disadvantage associated with a large civil full hoop blade track may be that the large diameter of the blade track is difficult to manufacture. Firstly, manufacture of the full hoop blade track may require larger processing equipment and in some cases, different processes as well. As a result, increased costs may be associated with the investment in larger equipment as well as the development of a different process required by the new, larger processing equipment. Secondly, creation of the large diameter of the full hoop blade track may be difficult with a thin walled part because the part may become distorted so that the part lacks a circular shape. Thus, cost and tolerance capability may pose drawbacks to the manufacture of a full hoop blade track.

To address the drawbacks of a full hoop blade track, the present disclosure contemplates a full hoop CMC blade track, such as the blade track 24, built from multiple segments, such as segments 33, 34, 35. The full hoop blade track constructed of multiple segments may take the form of several embodiments. However, in each of these embodiments, each segment may connect to a neighboring segment via axial flanges extending along the sides of each of the segments, such as the flanges 33F, 34F, 35F. Contact between the segments as they are forced together into a solid ring may provide a seal between the gas path and the cavity outboard of the ring of CMC segments.

In one feature that may be provided to enable the present disclosure, the full hoop may be cross-keyed in place to mount it concentric to the centerline of the engine, such as the central axis 28. In another feature that may be provided to enable the present invention, the full hoop, once assembled and coated, may have its inner surface/flowpath face, such as the flowpath surface 44, machined. This may allow for greater tolerances for the CMC parts during the assembly process while also providing a desirable flowpath definition. As a result, tight blade tip clearance impacting the SFC of the engine may be maintained.

In the embodiment of the blade track 24 shown in FIGS. 2-3, three or more segments, such as the segments 33, 34, 35, may be used to create a full hoop assembly. The segments may have a constant cross-section extruded from the leading edge (LE) to trailing edge (TE). The basic cross-section may be have an arc radius like the runners 33R, 34R, 35R, with an upturned flange on each end, such as the flanges 33F, 34F, 35F. One advantage of this embodiment may be that such segment geometry may be relatively simple to manufacturing, thereby facilitating traditional fiber layup methods or other layup methods such as 3D weave.

After full CMC processing, the segments may then be assembled together into a full hoop. By abutting the segments against one another, the segments may form a complete hoop in which none of the segments can move radially inward due to the neighboring segments. Inward load may be carried as compressive hoop load.

The segments may then be bolted together at the axial flanges so that the assembly stays together during handling, assembly, and when the hoop is not loaded or is loaded in tension (with higher pressure on the gaspath face). An abradable coating may applied to the gaspath face of individual segments or to the gaspath face of the assembled hoop to accommodate tip rub. The gaspath surface may be machined as an assembly to provide a tightly controlled surface.

The full hoop assembly may be located concentric to the engine centerline via cross-key mounting. Such a mounting arrangement may allow the blade track hoop to freely grow radially relative to the supporting case, such as the case 20, or carrier while maintaining concentricity to the engine centerline. The cross-keying to the carrier or case may be accomplished via the axial flanges. Since this embodiment may include at least three axial flanges, these flanges may be used to cross-key the full hoop to constrain it to be concentric with the engine centerline. This may eliminate the stress concentration issues associated with other cross-key ROI configurations.

One advantage of the present disclosure is that it may facilitate manufacture of a large diameter full hoop blade track. Another advantage of the present disclosure may be that the upturned flanges provide good contact faces between segments. When compared to segments that are only as thick as the flowpath portion of the segments at the interface between the segments, the larger area may provide a larger surface to carry contact loads. This configuration may also provide a much better fiber orientation for contact faces with the fibers running parallel to the contact faces instead of normal to the contact face (loading on the ends of fibers).

In alternate embodiments, the present disclosure may be applied to CMC blade tracks of compressors, such as the compressor 14. The CMC segments may have other features that may be needed to provide the desired stiffness, such as, for example, conical portions of stiffening ribs. The CMC segments may be assembled together in a partially processed state, such as following the chemical vapor infiltration (CVO process, and further processed so that the segments are integrally joined. Bolts, or some other form of joining the segments, may not be needed in this case, but may be used to add strength to the joints. The CMC segments may have EBC or abradable coatings applied to the segments prior to being assembled into a full hoop or following assembly of the full hoop. If it is not necessary to maintain a desired tip clearance tolerance, machining of the flowpath surface may be omitted.

In alternate embodiments, the bolts and nuts may be traditional components, such as the fastener 40 and the nuts 43, 47, or they may have other configurations to deal with the relative thermal growth between the metal bolts and the CMC flanges. The coefficients of thermal expansion (alpha) of the metal bolts may be significantly higher than that of CMC. As a result, at high operating temperatures, the bolts may grow much more than the CMC flanges, and the preload on the bolts may be lost. The bolts, washers, or bushings may be of the type described in NASA Tech Memo TM-100611 or Tech Paper 2226. The bolted arrangement employed may be that described in Rolls-Royce patent application, "Bi-Metal Fastener for Thermal Growth Compensation." A bolted CMC fastener as described in Rolls-Royce patent 7988395 may also be used. This may permit a CMC "bolt" such that the thermal growth of the "bolt" may be very similar to the CMC flanges. In other embodiments, the bolts and nuts may be monolithic components formed from ceramic matrix composite material.

In another embodiment, such as the blade track 124 shown in FIG. 4, an additional component, such as the flange spacer 146, may be sandwiched between two segment flanges such as the flanges 133F, 135F to thereby create a triple flange. This third piece may have a bulbous end or "T" cross-section which may create a shoulder, such as the shoulder 150, on which the segments may rest. This additional piece, or hanger, may be made of CMC, monolithic ceramic, a hybrid of CMC and ceramic (ceramic core), or of cooled and TBC coated metal. The advantage of this configuration may be the added protection of segment support by either the bolted flanges or by the sandwiched hanger. A metal liner or segment, such as the segments 160, 161, may be applied to the sandwiched hanger embodiment, or to the embodiment described above with regard to FIGS. 2 and 3. The liner may be used to manage pressure loads and/or cooling air flow on the back side of the CMC segments.

In another embodiment, such as the blade track 224 shown in FIG. 5, the segments may be coupled together without holes in the axial flanges, such as the flanges 233F, 235F, and without the bolts passing through the CMC flanges. In this embodiment, an "L" shape extruded axially (like angle iron) may create metal brackets which may be assembled on either side of the flanged joint. These brackets may be located radially by a step, dowel, or other feature located on the side of the CMC flanges, by the back side of the CMC flowpath, or by an intermediate piece located between the back side of the CMC flowpath surface and the bracket. Such an intermediate piece may be captured in place by features on the brackets. Bolts and nuts may then used to bolt the two brackets together, thereby clamping the axial CMC flanges together. The axial flanges may be scalloped to allow the centerline of the bolts to be closer or below the outer extremity of the axial flanges.

In another embodiment, such as the blade track 324 shown in FIG. 6, "C" clips, such as the clip 374, may extend across the flanges, such as the flanges 333F, 335F, to hold the flanges together. When assembled into the engine, the assembly may provide a piece passing above the "C" clips to resist the clips from backing off radially, thereby unclamping the flanges. These "C" clips may be metallic and may use their flexibility to provide spring load that clamps the flanges together.

In another embodiment, such as the blade track 424 shown in FIG. 7, the shape of the flanges, such as the flanges 480F, 482F, may be used to radially locate the segments relative to one another. The bolts may have a belt and suspenders arrangement that may be maintained with a load.

In another embodiment, such the assembly 513 shown in FIG. 8, a full hoop assembly made from segments with radial flanges at the split lines, such as the flanges 533F, 535F, may be provided. An axial key feature, such as the locating key 515, may be provided. The key feature may be made from CMC. The key may act as a way to locate each segment axially with respect to its neighboring segment prior to brazing or co-processing. Cuts in the radial flanges may be accomplished so that the cuts go entirely through the thickness of one flange and only halfway through the thickness of the other flange. The assembly tooling may be used to fill the void and locate each component. In the final product, this "keyway" may be used to locate or anti-rotate the full hoop CMC component.

In another embodiment, such as the assembly 617 shown in FIGS. 9-10, the flanges, such as the flanges 633F, 635F, may be held together using bow tie CMC pieces, such as the connector 619. Flat CMC pieces with a bow tie shape (two triangles joined at two of the apexes) may be placed in matching radial slots in the axial flanges, such as the channels 653, 655. Once assembled in the engine, neighboring components may not allow adequate clearance for the bow tie fasteners to back out of the slots. The bow tie pieces may be placed in the slots with an interference fit. This may preload the flanges together. Because the bow tie pieces are also CMC and are closely held together, they may have approximately the same thermal growth as the flanges, and therefore minimal loss of the interference fit may occur during operation. In fact, if the temperature of the bow ties is slightly lower than the flanges (since there may be some resistance to thermal conduction through the interface), then the interference fit may be slightly improved during operation, thereby permitting the flanges to be held together. In an alternate configuration of this embodiment, the segments and the bow tie pieces may be processed separately through CVI. Thereafter, the segments and the bow tie pieces may be assembled together to form the full hoop and further processed. The result may be an integral full hoop assembly with bow tie pieces that add strength to the joint between segments.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track assembly for a gas turbine engine, the blade track assembly comprising
   a plurality of ceramic matrix composite blade track segments arranged circumferentially adjacent to one another around a central axis, each of the plurality of blade track segments including an arcuate runner extending in a circumferential direction around a portion of the central axis and a pair of flanges extending outwardly in a radial direction away from circumferential ends of the arcuate runner,
   wherein each one of the pair of flanges of each of the plurality of blade track segments is coupled to a corresponding flange of a circumferentially adjacent blade track segment to resist movement of the plurality of blade track segments relative to each other,
   wherein each flange of the pair of flanges is formed to include a channel extending circumferentially through and radially into each flange of the pair of flanges, and the channels of the circumferentially adjacent blade track segments are aligned.

2. The blade track assembly of claim 1, wherein the pair of flanges of each of the plurality of blade track segments are generally planar.

3. The blade track assembly of claim 1, further comprising a plurality of locating keys, each one of the plurality of locating keys received in the channels of the circumferentially adjacent blade track segments to locate the circumferentially adjacent blade track segments relative to one another in an axial direction parallel to the central axis.

4. The blade track assembly of claim 1, wherein the plurality of locating keys are made of ceramic matrix composite materials.

5. An assembly adapted for use in a gas turbine engine, the assembly comprising
   a plurality of ceramic matrix composite material segments arranged circumferentially adjacent to one another around a central axis, each of the plurality of ceramic matrix composite material segments including an arcuate surface extending in a circumferential direction around a portion of the central axis and a plurality of flanges extending outwardly in a radial direction away from the arcuate surface, and
   a plurality of ceramic matrix composite material connectors received by flanges of circumferentially adjacent ceramic matrix composite material segments to secure circumferentially adjacent ceramic matrix composite material segments to one another,
   wherein each of the plurality of flanges is formed to include a channel extending circumferentially through and radially into each of the plurality of flanges, and each of the plurality of ceramic matrix composite material connectors is received in the channels of circumferentially adjacent ceramic matrix composite material segments.

6. The assembly of claim 5, wherein when one of the plurality of ceramic matrix composite material connectors is received in the channels of circumferentially adjacent ceramic matrix composite material segments, an interference fit is formed between the one of the ceramic matrix composite material connectors and the circumferentially adjacent ceramic matrix composite material segments.

7. An assembly comprising
   a first component consisting essentially of ceramic matrix composite material, the first component having an external face and an internal face opposite the external face of the first component,
   a second component consisting essentially of ceramic matrix composite material, the second component having an external face and an internal face opposite the external face of the second component arranged in confronting relation with the internal face of the first component, and
   a fastener consisting essentially of ceramic matrix composite material that extends through the first component and the second component to couple the first component and the second component, the fastener including a first flared head that extends into the first component from the external face of the first component toward the internal face of the first component, a second flared head that extends into the second component from the external face of the second component toward the internal face of the second component, and a body that extends through the internal faces of the first and second components and interconnects the first flared head and the second flared head, wherein each of the first component and the second component are formed to include a channel extending circumferentially through and radially into each of the first component and the second component, and wherein the fastener is received in the channels of the first component and second component.

8. The assembly of claim 7, wherein (i) the body interconnects the first flared head at a first neck of the fastener, (ii) the body interconnects the second flared head at a second neck of the fastener, and (iii) the first and second flared heads extend outwardly in an axial direction from the respective first and second necks toward the respective external faces of the first and second components.

9. The assembly of claim 7, wherein the fastener comprises a plurality of strands including ceramic-containing reinforcement fibers that extend through the first and second components from the external face of the first component to the external face of the second component.

* * * * *